United States Patent
Kume et al.

(10) Patent No.: US 10,461,521 B2
(45) Date of Patent: Oct. 29, 2019

(54) DRIVING CIRCUIT, CONTROL DEVICE, AND PROTECTION METHOD FOR DRIVING CIRCUIT

(71) Applicant: FUJITSU TEN LIMITED, Kobe-shi, Hyogo (JP)

(72) Inventors: Masayoshi Kume, Kobe (JP); Motoki Komiya, Kobe (JP)

(73) Assignee: DENSO TEN Limited, Kobe-shi (JP)

( * ) Notice: Subject to any disclaimer, the term of this patent is extended or adjusted under 35 U.S.C. 154(b) by 279 days.

(21) Appl. No.: 15/680,834

(22) Filed: Aug. 18, 2017

(65) Prior Publication Data

US 2018/0076613 A1    Mar. 15, 2018

(30) Foreign Application Priority Data

Sep. 14, 2016   (JP) ................. 2016-179946

(51) Int. Cl.
  *H02H 5/00*   (2006.01)
  *H02H 5/04*   (2006.01)
  *H02H 1/00*   (2006.01)
(52) U.S. Cl.
  CPC .......... *H02H 5/041* (2013.01); *H02H 1/0007* (2013.01)

(58) Field of Classification Search
  None
  See application file for complete search history.

(56) References Cited

U.S. PATENT DOCUMENTS 9,069,301 B2 *  6/2015  Oi ..................... G03G 15/2039

FOREIGN PATENT DOCUMENTS

JP    2009-284576 A    12/2009

* cited by examiner

*Primary Examiner* — Stephen W Jackson
(74) *Attorney, Agent, or Firm* — Oliff PLC (57) ABSTRACT

A driving circuit according to an embodiment includes a driving unit, a first temperature detecting unit, an overheat protecting unit, a second temperature detecting unit, and a failure diagnosing unit. The driving unit supplies a driving current to a load based on a control signal input from a controller. The overheat protecting unit blocks supply of the driving current to the load when the level of the signal output from the first temperature detecting unit exceeds a temperature threshold. The failure diagnosing unit blocks supply of the driving current to the load and outputs a signal of a level corresponding to a temperature out of a temperature range detectable by the second temperature detecting unit to the controller when it is determined that the first temperature detecting unit breaks down.

10 Claims, 7 Drawing Sheets

| PRESENCE OR ABSENCE OF FAILURE OF FIRST TEMPERATURE DETECTING UNIT | TEMPERATURE CONDITION OF DRIVING CIRCUIT | OUTPUT OF FIRST TEMPERATURE DETECTING UNIT | OUTPUT OF OVERHEAT DETERMINING UNIT | OUTPUT OF FAILURE-FOR-OVERHEAT DIAGNOSING UNIT | OUTPUT OF OVERHEAT PROTECTING UNIT | OPERATING STATE OF DRIVING UNIT | OUTPUT OF SECOND TEMPERATURE DETECTING UNIT |
|---|---|---|---|---|---|---|---|
| ABSENCE OF FAILURE | NORMAL TEMPERATURE | LEVEL ACCORDING TO TEMPERATURE | Hi | Hi | Hi | SUPPLY OF DRIVING CURRENT | LEVEL ACCORDING TO TEMPERATURE |
| ABSENCE OF FAILURE | OVERHEATED STATE | LEVEL ACCORDING TO TEMPERATURE | Lo | Hi | Lo | BLOCK OF DRIVING CURRENT | LEVEL ACCORDING TO TEMPERATURE |
| PRESENCE OF FAILURE | NORMAL TEMPERATURE | LEVEL LOWER THAN LEVEL CORRESPONDING TO LOWER LIMIT OF DETECTABLE TEMPERATURE | Hi | Lo | Lo | BLOCK OF DRIVING CURRENT | LEVEL LOWER THAN LEVEL CORRESPONDING TO LOWER LIMIT OF DETECTABLE TEMPERATURE |
| PRESENCE OF FAILURE | OVERHEATED STATE | LEVEL LOWER THAN LEVEL CORRESPONDING TO LOWER LIMIT OF DETECTABLE TEMPERATURE | Hi | Lo | Lo | BLOCK OF DRIVING CURRENT | LEVEL LOWER THAN LEVEL CORRESPONDING TO LOWER LIMIT OF DETECTABLE TEMPERATURE |

| PRESENCE OR ABSENCE OF FAILURE OF CURRENT DETECTING UNIT | STATE OF OUTPUT CURRENT | OUTPUT OF CURRENT DETECTING UNIT | OUTPUT OF OVERCURRENT DETERMINING UNIT | OUTPUT OF FAILURE-FOR-OVERCURRENT DIAGNOSING UNIT | OUTPUT OF OVERCURRENT PROTECTING UNIT | OPERATING STATE OF DRIVING UNIT | OUTPUT OF SECOND TEMPERATURE DETECTING UNIT |
|---|---|---|---|---|---|---|---|
| ABSENCE OF FAILURE | NORMAL CURRENT | LEVEL ACCORDING TO CURRENT | Hi | Hi | Hi | SUPPLY OF DRIVING CURRENT | LEVEL ACCORDING TO TEMPERATURE |
| ABSENCE OF FAILURE | OVERCURRENT STATE | LEVEL ACCORDING TO CURRENT | Lo | Hi | Lo | BLOCK OF DRIVING CURRENT | LEVEL ACCORDING TO TEMPERATURE |
| PRESENCE OF FAILURE | NORMAL CURRENT | LEVEL LOWER THAN LEVEL CORRESPONDING TO LOWER LIMIT OF DETECTABLE CURRENT | Hi | Lo | Lo | BLOCK OF DRIVING CURRENT | LEVEL HIGHER THAN LEVEL CORRESPONDING TO UPPER LIMIT OF DETECTABLE TEMPERATURE |
| PRESENCE OF FAILURE | OVERCURRENT STATE | LEVEL LOWER THAN LEVEL CORRESPONDING TO LOWER LIMIT OF DETECTABLE CURRENT | Hi | Lo | Lo | BLOCK OF DRIVING CURRENT | LEVEL HIGHER THAN LEVEL CORRESPONDING TO UPPER LIMIT OF DETECTABLE TEMPERATURE |

DRIVING CIRCUIT, CONTROL DEVICE, AND PROTECTION METHOD FOR DRIVING CIRCUIT

CROSS-REFERENCE TO RELATED APPLICATION

This application is based upon and claims the benefit of priority of the prior Japanese Patent Application No. 2016-179946, filed on Sep. 14, 2016, the entire contents of which are incorporated herein by reference.

FIELD

The embodiment discussed herein is directed to a driving circuit, a control device, and a protection method for the driving circuit.

BACKGROUND

There is known a conventional control device that includes: a controller that outputs a control signal for controlling the drive of a load; and a driving circuit that supplies a driving current from a power source to the load to drive the load on the basis of the control signal from the controller.

When an abnormal large current flows into its inside from any cause, the driving circuit may enter an overheated state to be destroyed. For this reason, there is a control device that includes: a temperature detecting unit that detects a temperature near the driving circuit; and a controller that monitors the temperature detected by the temperature detecting unit and blocks the supply of a driving current to the load when it is determined that the driving circuit enters an overheated state (for example, see Japanese Laid-open Patent Publication No. 2009-284576).

In addition to the configuration that the controller determines an overheated state, there is a control device that has a configuration that the driving circuit itself determines an overheated state and blocks the supply of a driving current to a load so as to beforehand prevent the burnout destruction of the driving circuit more surely.

The driving circuit of the control device includes a temperature detecting unit that outputs the detected temperature to an overheat determining unit in the driving circuit, separately from the temperature detecting unit that outputs the detected temperature to the controller. When the overheat determining unit determines that the temperature is not less than a temperature threshold, the driving circuit blocks the supply of a driving current to the load.

As a result, when the control device cannot prevent the burnout destruction of the driving circuit by requiring time in an overheated state determination process performed by the controller due to the instant rising of the temperature of the driving circuit, the driving circuit can immediately block the supply of a driving current to the load.

However, the temperature detecting unit in the driving circuit may break down. In this case, because the controller cannot determine the presence or absence of a failure of the temperature detecting unit in the driving circuit, the control device cannot prevent the burnout destruction of the driving circuit in that an overheated state determination process performed by the controller causes delay when the temperature of the driving circuit instantly rises as described above.

SUMMARY

A driving circuit according to an embodiment includes a driving unit, a first temperature detecting unit, an overheat protecting unit, a second temperature detecting unit, and a failure diagnosing unit. The driving unit supplies a driving current to a load based on a control signal input from a controller. The first temperature detecting unit outputs a signal according to a detected temperature. The overheat protecting unit blocks supply of the driving current to the load when the level of the signal output from the first temperature detecting unit exceeds a temperature threshold. The second temperature detecting unit outputs a signal according to a detected temperature to the controller. The failure diagnosing unit blocks supply of the driving current to the load and outputs a signal of a level corresponding to a temperature out of a temperature range detectable by the second temperature detecting unit to the controller when it is determined that the first temperature detecting unit breaks down.

BRIEF DESCRIPTION OF DRAWINGS

A more complete appreciation of the present application and many of the attendant advantages thereof will be readily obtained as the same becomes better understood by reference to the following detailed description when considered in connection with the accompanying drawings, wherein.

DESCRIPTION OF EMBODIMENTS

Figure 1:
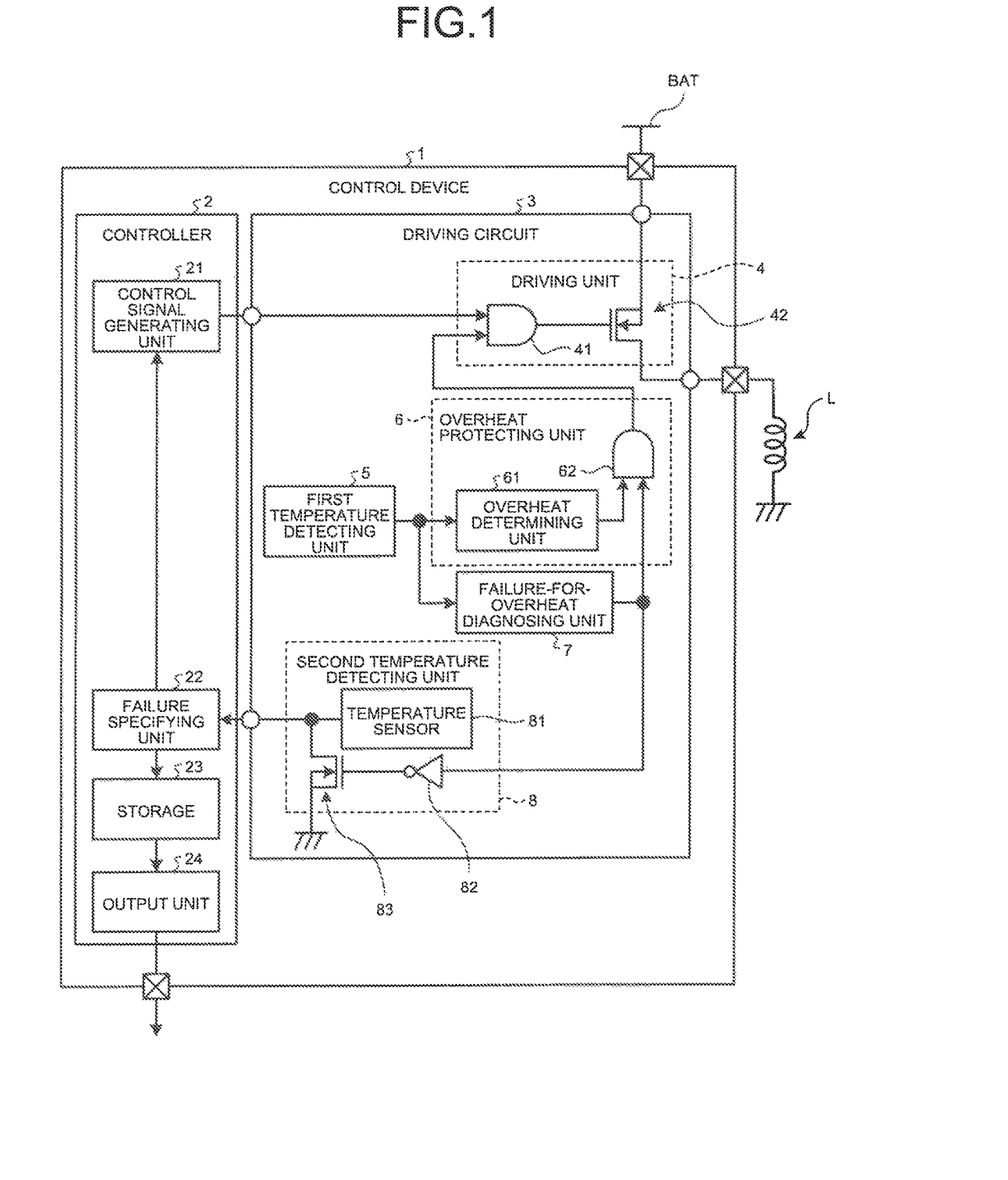
FIG. 1 is a diagram explaining the configuration of a control device according to an embodiment.

Hereinafter, a driving circuit, a control device, and a protection method for the driving circuit according to an embodiment will be explained in detail with reference to the accompanying drawings. Moreover, this invention is not limited to the embodiment described below. FIG. 1 is a diagram explaining the configuration of a control device 1 according to the embodiment.

As illustrated in FIG. 1, the control device 1 according to the embodiment is a device that is connected between a load L and a power source line BAT connected to a power source and performs supply control of a driving current to the load L from the power source line BAT. For example, the control device 1 is an electronic control unit (ECU) that is mounted on a vehicle.

Herein, the load L is, for example, a solenoid that drives CVT (continuously variable transmission) of the vehicle. However, the load L to which the control device 1 according to the embodiment supplies a driving current is not limited to the solenoid that drives CVT. Therefore, the load L may be an arbitrary electronics device, such as a headlight or a starter motor of a vehicle, which requires a large current for its actuation.

As described above, because the control device 1 supplies a large driving current to the load L, an abnormal large current flows into a driving circuit 3 in the control device 1 to cause an overheated state and thus the driving circuit 3 may be destroyed when a harness for connecting the load L and the driving circuit 3 causes a ground fault from any cause, for example. Moreover, because the control device 1 drives CVT etc. deeply related to safe traveling of the vehicle, it is required to beforehand prevent the generation of burnout destruction due to an abnormal large current.

For this reason, the control device 1 detects an internal temperature, and when the detected temperature is not less than a temperature threshold, improves running safety of a vehicle by including two fail-safe systems for blocking the supply of a driving current to the load L.

Furthermore, when one system of two fail-safe systems breaks down, the control device 1 has a function that specifies and stores the generated failure and outputs that effect to the outside so as to improve the running safety and maintenance of a vehicle.

Specifically, the control device 1 includes a controller 2 and the driving circuit 3. The controller 2 includes a microcomputer and various types of circuits having a central processing unit (CPU), a read only memory (ROM), a random access memory (RAM), an input-output port, and the like, for example.

The controller 2 includes a plurality of processing units that functions by causing the CPU to execute a drive control program stored in the ROM by using the RAM as a working area. Specifically, the controller 2 includes a control signal generating unit 21, a failure specifying unit 22, and an output unit 24. Furthermore, the controller 2 includes a storage 23.

A part or the whole of the processing units included in the controller 2 may be configured by hardware such as an application specific integrated circuit (ASIC) and a field programmable gate array (FPGA).

The control signal generating unit 21 is a processing unit that generates a control signal for causing the driving circuit 3 to supply a driving current from the power source line BAT to the load L and outputs the control signal to the driving circuit 3. When the driving current is supplied from the power source line BAT to the load L, the control signal generating unit 21 outputs a control signal, whose voltage level (hereinafter, simply referred to as "level") is a HIGH (hereinafter, referred to as "Hi") level, for example, to the driving circuit 3.

When the supply of the driving current to the load L from the power source line BAT is blocked, the control signal generating unit 21 outputs a control signal whose level is a LOW (hereinafter, referred to as "Lo") level to the driving circuit 3.

The failure specifying unit 22 determines whether the driving circuit 3 reaches an overheated state on the basis of the level of the signal from the driving circuit 3. Specifically, the failure specifying unit 22 receives, from the driving circuit 3, a signal indicating that a level rises in accordance with the temperature rise of the driving circuit 3 when the driving circuit 3 does not break down.

Then, the failure specifying unit 22 samples the level of the signal received from the driving circuit 3, and determines that the driving circuit 3 reaches the overheated state when the sampled result is not less than a temperature threshold. On the other hand, when the sampled result is less than the temperature threshold, the failure specifying unit 22 determines that the driving circuit 3 does not reach the overheated state.

At this time, the failure specifying unit 22 samples the level of the received signal multiple times and determines whether the driving circuit 3 reaches an overheated state so as to prevent the false determination of an overheated state caused by noise etc. Then, when it is determined that the driving circuit 3 reaches the overheated state, the failure specifying unit 22 outputs a signal indicating that effect to the control signal generating unit 21.

When the signal indicating that the driving circuit 3 reaches the overheated state is input from the failure specifying unit 22, the control signal generating unit 21 outputs a Lo-level control signal to the driving circuit 3 to block the supply of the driving current to the load L from the power source line BAT.

A system in which the failure specifying unit 22 determines the overheated state of the driving circuit 3 to block the supply of the driving current to the load L from the power source line BAT is a first fail-safe system. A second fail-safe system is a system in which the driving circuit 3 determines its overheated state to block the supply of the driving current to the load L from the power source line BAT. The second fail-safe system will be described below together with the explanation of the driving circuit 3.

When the second fail-safe system breaks down, the failure specifying unit 22 receives from the driving circuit 3 a signal of a level corresponding to a temperature out of a detectable temperature range inside the driving circuit 3. As a result, the failure specifying unit 22 can specify the failure of the second fail-safe system inside the driving circuit 3.

When the failure of the second fail-safe system is specified, the failure specifying unit 22 outputs a signal indicating that effect to the control signal generating unit 21. When the signal indicating that the failure of the second fail-safe system is specified is input from the failure specifying unit 22, the control signal generating unit 21 blocks the supply of the driving current to the load L from the power source line BAT.

The failure specifying unit 22 outputs to the storage 23 information indicating that the second fail-safe system breaks down and causes the storage 23 to store the information. The storage 23 is a semiconductor memory device such as a random access memory (RAM) and a flash memory or a storage device such as a hard disk drive (HDD) and an optical disc, for example, and stores therein information input from the failure specifying unit 22.

The output unit 24 is a processing unit that reads out the stored information from the storage 23 and outputs the information to the outside. When a predetermined testing device (not illustrated) is connected thereto, for example, the output unit 24 outputs to the testing device the information stored in the storage 23 indicating that the second fail-safe system breaks down. Moreover, when the information indicating that the second fail-safe system breaks down is stored in the storage 23, the output unit 24 can output a signal indicating that effect to an install panel, for example, to cause a warning light to flash.

As described above, the controller 2 can monitor the overheated state of the driving circuit 3 on the basis of the signal input from the driving circuit 3, and block the supply of the driving current to the load L from the power source line BAT when reaching the overheated state, so as to prevent the burnout destruction of the driving circuit 3.

When it is specified that the second fail-safe system breaks down on the basis of the signal input from the driving circuit 3, the controller 2 can immediately block the supply of the driving current to the load L from the power source line BAT. As a result, when the driving circuit 3 reaches an overheated state, the control device 1 can prevent the burnout destruction of the driving circuit 3 even if a determination for an overheated state requires a time in the first fail-safe system.

The driving circuit 3 includes a driving unit 4, a first temperature detecting unit 5, an overheat protecting unit 6, a failure-for-overheat diagnosing unit 7, and a second temperature detecting unit 8. The driving unit 4 causes the power source line BAT to supply a driving current to the load L so as to drive the load L on the basis of the control signal input from the controller 2. The driving unit 4 includes an AND circuit 41 and an N-channel MOS (Metal Oxide Semiconductor) field effect transistor (hereinafter, referred to as "nMOS") 42.

When the levels of the control signal input from the controller 2 and the signal input from the overheat protecting unit 6 are a Hi level together, the AND circuit 41 applies a Hi-level voltage to a gate of the nMOS 42. On the other hand, when both or one of the level of the control signal input from the controller 2 and the level of the signal input from the overheat protecting unit 6 are/is a Lo level, the AND circuit 41 applies a Lo-level voltage to the nMOS 42.

When a Hi-level voltage is applied to the gate from the AND circuit 41, the nMOS 42 is turned ON to supply a driving current from the power source line BAT to the load L. Moreover, when a Lo-level voltage is applied to the gate from the AND circuit 41, the nMOS 42 is turned OFF to block the supply of the driving current to the load L from the power source line BAT.

The first temperature detecting unit 5 is a temperature sensor that detects a temperature of the driving circuit 3. The first temperature detecting unit 5 outputs a signal of a level according to the detected temperature to the overheat protecting unit 6 and the failure-for-overheat diagnosing unit 7.

The first temperature detecting unit 5 has a detectable temperature range. The first temperature detecting unit 5 outputs, for example, a signal having a level of 2V when detecting a temperature of a lower limit (for example, 40 degrees Celsius) of the detectable temperature range, and outputs, for example, a signal having a level of 4V when detecting a temperature of an upper limit (for example, 150 degrees Celsius) of the detectable temperature range.

In other words, in a state where any does not break down, the first temperature detecting unit 5 outputs a signal of a level according to a detected temperature between levels of 2V to 4V to an overheat determining unit 61 and the failure-for-overheat diagnosing unit 7. For example, when a short-circuit failure of the internal circuit and semiconductor device occurs or when an open failure of wiring between elements occurs, the first temperature detecting unit 5 outputs a signal of a level (0V) lower than a level corresponding to a lower limit of a detectable temperature to the overheat determining unit 61 and the failure-for-overheat diagnosing unit 7.

When the level of the signal output from the first temperature detecting unit 5 is not less than the temperature threshold, the overheat protecting unit 6 determines that the driving circuit 3 reaches an overheated state and causes the driving unit 4 to block the supply of the driving current to the load L. The overheat protecting unit 6 includes the overheat determining unit 61 and an AND circuit 62.

When the level of the signal input from the first temperature detecting unit 5 is less than the temperature threshold, the overheat determining unit 61 determines that the driving circuit 3 does not reach an overheated state but is in a normal temperature condition, and outputs a Hi-level signal to the AND circuit 62.

When the level of the signal input from the first temperature detecting unit 5 is not less than the temperature threshold, the overheat determining unit 61 determines that the driving circuit 3 is in the overheated state, and outputs a Lo-level signal to the AND circuit 62. Moreover, an example of a circuit configuration of the overheat determining unit 61 will be described below with reference to FIG. 2.

When the levels of the signal input from the overheat determining unit 61 and the signal input from the failure-for-overheat diagnosing unit 7 are the Hi level together, the AND circuit 62 of the overheat protecting unit 6 outputs the Hi-level signal to the AND circuit 41 of the driving unit 4.

When both or one of the level of the signal input from the overheat determining unit 61 and the level of the signal input from the failure-for-overheat diagnosing unit 7 are/is the Lo level, the AND circuit 62 of the overheat protecting unit 6 outputs the Lo-level signal to the AND circuit 41 of the driving unit 4.

When a signal of a level corresponding to a temperature within the temperature range detectable by the first temperature detecting unit 5 is output from the first temperature detecting unit 5, the failure-for-overheat diagnosing unit 7 determines that the first temperature detecting unit 5 does not break down. Moreover, when a signal of a level lower than a level corresponding to the lower limit of the temperature detectable by the first temperature detecting unit 5 is output from the first temperature detecting unit 5, the failure-for-overheat diagnosing unit 7 determines that the first temperature detecting unit 5 breaks down.

Then, when it is determined that the first temperature detecting unit 5 breaks down, the failure-for-overheat diagnosing unit 7 causes the driving unit 4 to black the supply of the driving current to the load L, and causes the second temperature detecting unit 8 to output a signal of a level corresponding to a temperature out of the temperature range detectable by the second temperature detecting unit 8 to the controller 2.

When it is determined that the first temperature detecting unit 5 does not break down, the failure-for-overheat diagnosing unit 7 outputs the Hi-level signal to the AND circuit 62 of the overheat protecting unit 6 and a NOT circuit 82 (to be described later) of the second temperature detecting unit 8.

When it is determined that the first temperature detecting unit 5 breaks down, the failure-for-overheat diagnosing unit 7 outputs the Lo-level signal to the AND circuit 62 of the overheat protecting unit 6 and the NOT circuit 82 (to be described later) of the second temperature detecting unit 8.

Figure 2:
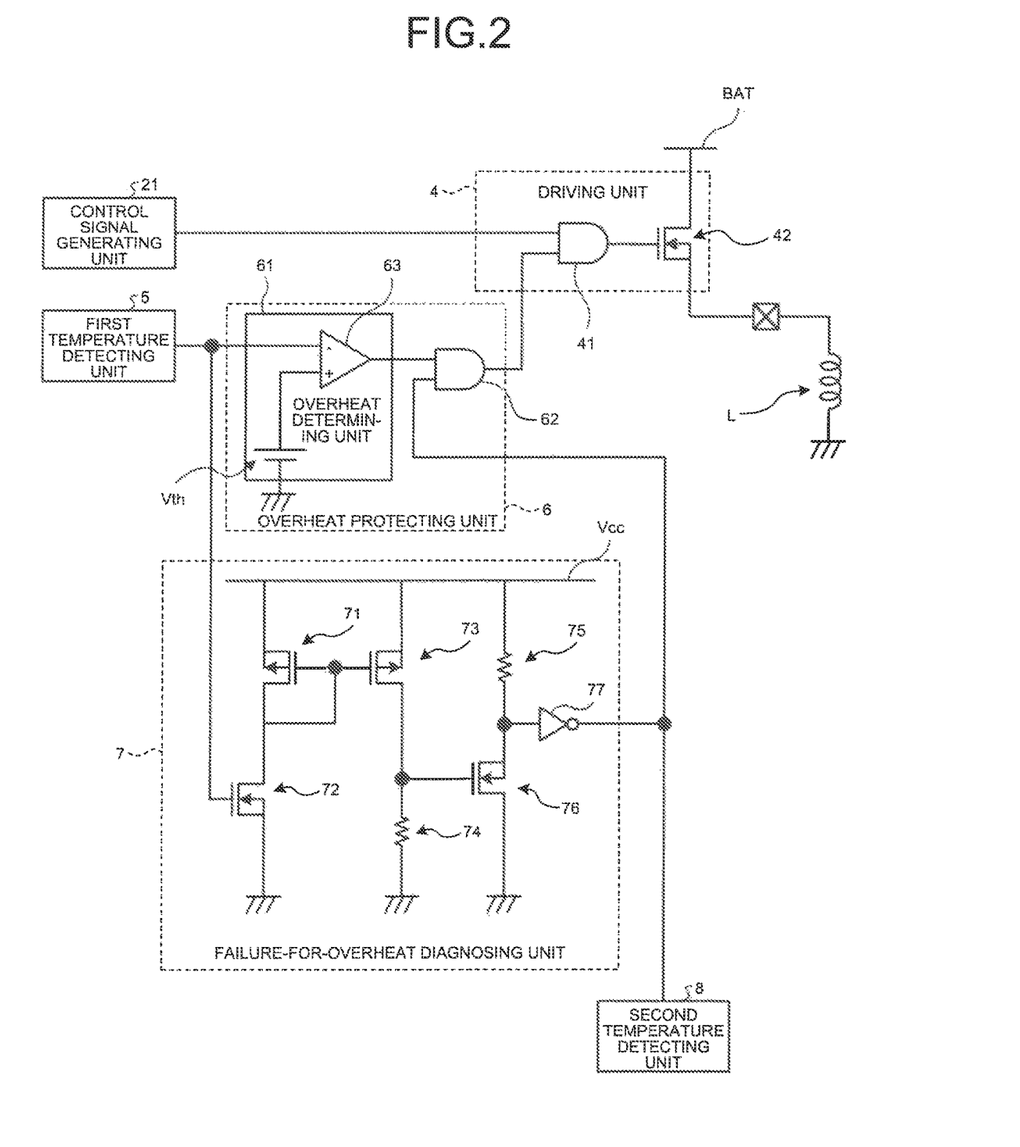
FIG. 2 is a diagram explaining an example of a circuit configuration of an overheat protecting unit and a failure-for-overheat diagnosing unit according to the embodiment.

Herein, an example of a circuit configuration of the overheat protecting unit 6 and the failure-for-overheat diagnosing unit 7 will be explained with reference to FIG. 2. FIG. 2 is a diagram explaining an example of a circuit configuration of the overheat protecting unit 6 and the failure-for-overheat diagnosing unit 7 according to the embodiment.

Among the components of the control device 1, the overheat protecting unit 6 and the failure-for-overheat diagnosing unit 7 and some components associated with operations of the overheat protecting unit 6 and the failure-for-overheat diagnosing unit 7 are illustrated in FIG. 2. Herein, in order to avoid duplication of explanation, the same reference numbers as those illustrated in FIG. 1 are assigned to components other than the overheat protecting unit 6 and the failure-for-overheat diagnosing unit 7, and their descriptions are omitted.

As illustrated in FIG. 2, the overheat protecting unit 6 includes the overheat determining unit 61 and the AND circuit 62. The overheat determining unit 61 includes a comparator 63 and a threshold power source Vth. A signal of a level corresponding to the temperature threshold is input into a positive input of the comparator 63 from the threshold power source Vth, and a signal of a level corresponding to the temperature detected from the first temperature detecting unit 5 is input into its negative input.

Then, when the level of the signal input from the first temperature detecting unit 5 is lower than the level (for example, 3.5V) of the signal input from the threshold power source Vth, the comparator 63 outputs the Hi-level signal to the AND circuit 62.

On the other hand, when the level of the signal input from the first temperature detecting unit 5 is not less than the level (for example, 3.5V) of the signal input from the threshold power source Vth, the comparator 63 outputs the Lo-level signal to the AND circuit 62.

The AND circuit 62 receives signals from the overheat determining unit 61 and the failure-for-overheat diagnosing unit 7. The failure-for-overheat diagnosing unit 7 outputs a Hi-level signal when the first temperature detecting unit 5 does not break down and outputs a Lo-level signal when it breaks down, to the AND circuit 62 of the overheat protecting unit 6. Then, when Hi-level signals are input from both of the overheat determining unit 61 and the failure-for-overheat diagnosing unit 7, the AND circuit 62 outputs the Hi-level signal to the AND circuit 41 of the driving unit 4.

At this time, when a Hi-level control signal is input from the control signal generating unit 21, the AND circuit 41 of the driving unit 4 applies a Hi-level voltage to the gate of the nMOS 42 to continue the supply of the driving current to the load L. In other words, when the first temperature detecting unit 5 does not break down and a temperature less than the temperature threshold is detected by the first temperature detecting unit 5, the driving circuit 3 continues the supply of the driving current to the load L.

When the Lo-level signal is input from the overheat determining unit 61 or when the Lo-level signal is input from the failure-for-overheat diagnosing unit 7, the AND circuit 62 of the overheat protecting unit 6 outputs the Lo-level signal to the AND circuit 41 of the driving unit 4.

At this time, the AND circuit 41 of the driving unit 4 applies the Lo-level voltage to the gate of the nMOS 42 to block the supply of the driving current to the load L. Moreover, when the Lo-level signal is input from the control signal generating unit 21, the AND circuit 41 applies the Lo-level voltage to the gate of the nMOS 42 to block the supply of the driving current to the load L.

In other words, when the first temperature detecting unit 5 breaks down, when a temperature not less than the temperature threshold is detected by the first temperature detecting unit 5, or when there is an instruction for stopping the drive of the load L from the driving unit 4, the driving circuit 3 blocks the supply of the driving current to the load L.

The failure-for-overheat diagnosing unit 7 includes a first P-channel MOS (Metal Oxide Semiconductor) field effect transistor (hereinafter, referred to as "pMOS") 71 and a first nMOS 72, which are serially connected between a predetermined reference voltage line Vcc and a ground. Moreover, the failure-for-overheat diagnosing unit 7 includes a second pMOS 73 and a first resistor 74 that are serially connected between the reference voltage line Vcc and the ground.

The failure-for-overheat diagnosing unit 7 includes a second resistor 75 and a second nMOS 76 that are serially connected between the reference voltage line Vcc and the ground, and includes a NOT circuit 77 whose input side is connected to a connection point of the second resistor 75 and the second nMOS 76.

The source of the first pMOS 71 is connected to the reference voltage line Vcc and its gate is connected to the gate of the second pMOS 73 and the drain of the first pMOS 71. The source of the first nMOS 72 is connected to the ground and its drain is connected to the drain of the first pMOS 71.

The source of the second pMOS 73 is connected to the reference voltage line Vcc and its drain is connected to the gate of the second nMOS 76 and one end of the first resistor 74. The other end of the first resistor 74 is connected to the ground.

One end of the second resistor 75 is connected to the reference voltage line Vcc and the other end is connected to the drain of the second nMOS 76 and the input of the NOT circuit 77. The output of the NOT circuit 77 is connected to the second temperature detecting unit 8 and the input of the AND circuit 62 of the overheat protecting unit 6. The source of the second nMOS 76 is connected to the ground.

In the failure-for-overheat diagnosing unit 7, a voltage according to the temperature detected from the first temperature detecting unit 5 is applied to the gate of the first nMOS 72 to turn ON the first nMOS 72 when the first temperature detecting unit 5 does not break down. Along with this, the first pMOS 71 and the second pMOS 73 are turned ON, and the Hi-level voltage is applied to the gate of the second nMOS 76 from the reference voltage line Vcc to turn ON the second nMOS 76.

As a result, because the Lo-level signal is input into the NOT circuit 77, the Hi-level signal is output from the NOT circuit 77. As described above, when the first temperature detecting unit 5 does not break down, the failure-for-overheat diagnosing unit 7 outputs the Hi-level signal to the AND circuit 62 of the overheat protecting unit 6 and the second temperature detecting unit 8.

In the failure-for-overheat diagnosing unit 7, a voltage corresponding to a temperature out of the temperature range detectable by the first temperature detecting unit 5 may be applied to the gate of the first nMOS 72 when the first temperature detecting unit 5 breaks down. For example, when a short-circuit failure of a circuit and a semiconductor device inside the first temperature detecting unit 5 occurs or when an open failure of wiring between elements occurs, the first temperature detecting unit 5 may output the voltage of 0V.

In this case, because the level of the signal input from the first temperature detecting unit 5 is less than the level (for example, 3.5V) of the signal input from the threshold power source Vth, the overheat protecting unit 6 continues to output a Hi-level signal indicative of a normal temperature condition even if the driving circuit 3 reaches an overheated state. As a result, the driving circuit 3 may be destroyed in some cases.

Therefore, when the first temperature detecting unit 5 breaks down, the failure-for-overheat diagnosing unit 7 detects the failure of the first temperature detecting unit 5 and outputs the Lo-level signal. Specifically, in the failure-for-overheat diagnosing unit 7, because the voltage of 0V is applied to the gate of the first nMOS 72 from the first temperature detecting unit 5 when the first temperature detecting unit 5 has the above failure, the first nMOS 72, the first pMOS 71, and the second pMOS 73 are turned OFF.

Along with this, because the second nMOS 76 is turned OFF, the Hi-level signal is input into the NOT circuit 77 and the Lo-level signal is output from the NOT circuit 77. As a result, when the first temperature detecting unit 5 breaks down, the failure-for-overheat diagnosing unit 7 can output the Lo-level signal to the AND circuit 62 of the overheat protecting unit 6 and the second temperature detecting unit 8 to block the supply of the driving current to the load L.

The configuration of the failure-for-overheat diagnosing unit 7 illustrated in FIG. 2 is an example. If the failure-for-overheat diagnosing unit 7 has a configuration that can diagnose the failure of the first temperature detecting unit 5, the failure-for-overheat diagnosing unit 7 can employ an arbitrary circuit. For example, the failure-for-overheat diagnosing unit 7 may be a comparator that compares a predetermined threshold voltage with the output of the first temperature detecting unit 5.

In case of this configuration, the comparator sets, as a threshold voltage, a voltage corresponding to a lower limit of a temperature detectable by the first temperature detecting unit 5, and outputs a Lo-level signal when the level of the signal input from the first temperature detecting unit 5 is less than the threshold voltage and outputs a Hi-level signal when the level of the signal is not less than the threshold voltage.

Again with reference to FIG. 1, the second temperature detecting unit 8 includes a temperature sensor 81, the NOT circuit 82, and an nMOS 83. The temperature sensor 81 is a sensor that detects a temperature of the driving circuit 3. The temperature sensor 81 outputs a signal of a level according to the detected temperature to the failure specifying unit 22 of the controller 2.

The temperature sensor 81 has a detectable temperature range. The temperature sensor 81 outputs a signal having a level of 2V, for example, when detecting a temperature of a lower limit (for example, 40 degrees Celsius) of the detectable temperature range, and outputs a signal having a level of 4V, for example, when detecting a temperature of an upper limit (for example, 150 degrees Celsius) of the detectable temperature range. In other words, the temperature sensor 81 outputs a signal of a level according to a detected temperature between levels of 2V to 4V in a state where any does not break down.

The input of the NOT circuit 82 is connected to the output of the failure-for-overheat diagnosing unit 7, and its output is connected to the gate of the nMOS 83 of the second temperature detecting unit 8. The source of the nMOS 83 of the second temperature detecting unit 8 is connected to the ground, and its drain is connected to the output of the temperature sensor 81.

In the second temperature detecting unit 8, when the Hi-level signal is input into the NOT circuit 82 from the failure-for-overheat diagnosing unit 7, namely when the first temperature detecting unit 5 does not break down, the NOT circuit 82 applies the Lo-level voltage to the gate of the nMOS 83 to turn OFF the nMOS 83. As a result, the second temperature detecting unit 8 outputs a signal of a level according to the temperature detected by the temperature sensor 81 to the failure specifying unit 22 of the controller 2.

At this time, because a signal of a level corresponding to a temperature within the temperature range detectable by the temperature sensor 81 is input from the second temperature detecting unit 8, the failure specifying unit 22 can monitor a temperature condition of the driving circuit 3 on the basis of the input signal.

Then, when the driving circuit 3 reaches an overheated state, the failure specifying unit 22 can output a signal indicating that effect to the control signal generating unit 21 to block the supply of the driving current to the load L. Therefore, the control device 1 can prevent the burnout destruction caused by the overheated state of the driving circuit 3.

In the second temperature detecting unit 8, when the Lo-level signal is input into the NOT circuit 82 from the failure-for-overheat diagnosing unit 7, namely when the first temperature detecting unit 5 breaks down, the NOT circuit 82 applies the Hi-level voltage to the gate of the nMOS 83 to turn ON the nMOS 83.

As a result, because the output of the temperature sensor 81 is connected to the ground, the second temperature detecting unit 8 outputs the signal of the level (herein, 0V) lower than a level corresponding to the lower limit of the temperature range detectable by the temperature sensor 81 to the failure specifying unit 22 of the controller 2.

At this time, because a signal of a level lower than the level corresponding to the lower limit of the temperature range detectable by the temperature sensor 81 is input from the second temperature detecting unit 8, the failure specifying unit 22 can specify that the failure of the driving circuit 3 is the failure of the first temperature detecting unit 5.

Then, when it is specified that the first temperature detecting unit 5 breaks down, the failure specifying unit 22 can output a signal indicating that effect to the control signal generating unit 21 to block the supply of the driving current to the load L. Therefore, the control device 1 can prevent the burnout destruction caused by the overheated state of the driving circuit 3.

As described above, when the first temperature detecting unit 5 breaks down, the driving circuit 3 included in the control device 1 outputs a signal of a low level (for example, 0V) that does not exist in a normal term (term in which the first temperature detecting unit 5 does not break down) to the controller 2 as diagnosis output. As a result, the driving circuit 3 can inform the controller 2 that the first temperature detecting unit 5 breaks down.

Therefore, even if the second fail-safe system in which the driving circuit 3 itself performs overheat protection is in a state where the system does not function, the control device 1 can specify the generation of the state by using the controller 2, immediately block the provision of a driving current to the load L, and thus prevent the burnout destruction of the driving circuit 3.

The driving circuit 3 shares an output terminal, which outputs the detection result of a temperature performed by the temperature sensor 81, as an output terminal of diagnosis output indicating that the first temperature detecting unit 5 breaks down. As a result, the control device 1 can suppress the increase of the number of output terminals of the driving circuit 3 and the number of input terminals of the controller 2.

According to the present embodiment, the driving circuit 3 can inform the controller 2 that the first temperature detecting unit 5 breaks down, and the controller 2 can specify the failure of the first temperature detecting unit 5, without largely changing a design of software and hardware.

Figure 3:
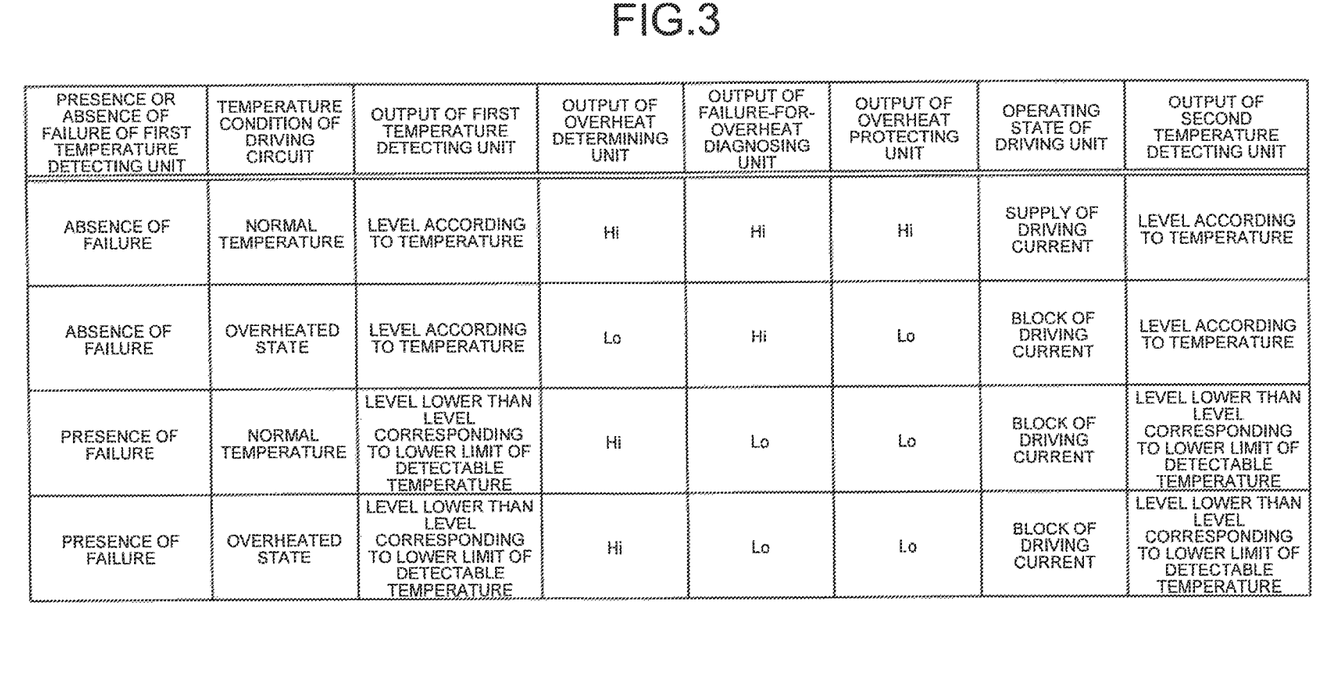
FIG. 3 is a diagram explaining an operating state in each state of the control device according to the embodiment.

Next, operations in each state of the control device 1 will be explained with reference to FIG. 1 and FIG. 3. FIG. 3 is a diagram explaining operating states in each state of the control device 1 according to the embodiment.

As illustrated in FIG. 3, when the first temperature detecting unit 5 does not have a failure and the driving circuit 3 is not in an overheated state but has a normal temperature, the level of the output of the first temperature detecting unit 5 becomes a level according to a detected temperature. In this case, because the level of the output of the overheat determining unit 61 becomes Hi and the level of the output of the failure-for-overheat diagnosing unit 7 becomes Hi, the level of the output of the overheat protecting unit 6 becomes Hi. As a result, the driving unit 4 can continue to supply the driving current to the load L.

At this time, the level of the output of the second temperature detecting unit 8 becomes a level according to a detected temperature. As a result, the controller 2 can monitor a temperature condition of the driving circuit 3 on the basis of the level of the output of the second temperature detecting unit 8.

When the first temperature detecting unit 5 does not have a failure and the driving circuit 3 is in an overheated state, the level of the output of the first temperature detecting unit 5 becomes a level according to a detected temperature. In this case, because the level of the output of the overheat determining unit 61 becomes Lo and the level of the output of the failure-for-overheat diagnosing unit 7 becomes Hi, the level of the output of the overheat protecting unit 6 becomes Lo. As a result, the driving unit 4 can block the supply of the driving current to the load L.

At this time, the level of the output of the second temperature detecting unit 8 becomes a level according to a detected temperature. As a result, the controller 2 can monitor a temperature condition of the driving circuit 3 on the basis of the level of the output of the second temperature detecting unit 8.

When the first temperature detecting unit 5 has a failure and the driving circuit 3 has a normal temperature, the level of the output of the first temperature detecting unit 5 becomes a level corresponding to a temperature lower than the lower limit of the detectable temperature. In this case, because the level of the output of the overheat determining unit 61 becomes Hi and the level of the output of the failure-for-overheat diagnosing-unit 7 becomes Lo, the level of the output of the overheat protecting unit 6 becomes Lo. As a result, the driving unit 4 can block the supply of the driving current to the load L.

At this time, the level of the output of the second temperature detecting unit 8 becomes a level corresponding to a temperature lower than the lower limit of the detectable temperature. As a result, the driving circuit 3 can inform the controller 2 that the first temperature detecting unit 5 breaks down.

When the first temperature detecting unit 5 has a failure and the driving circuit 3 is in an overheated state, the level of the output of the first temperature detecting unit 5 becomes a level corresponding to a temperature lower than the lower limit of the detectable temperature. In this case, because the level of the output of the overheat determining unit 61 becomes Hi and the level of the output of the failure-for-overheat diagnosing unit 7 becomes Lo, the level of the output of the overheat protecting unit 6 becomes Lo. As a result, the driving unit 4 can block the supply of the driving current to the load L.

At this time, the level of the output of the second temperature detecting unit 8 becomes a level corresponding to a temperature lower than the lower limit of the detectable temperature. As a result, the driving circuit 3 can inform the controller 2 that the first temperature detecting unit 5 breaks down.

Figure 4:
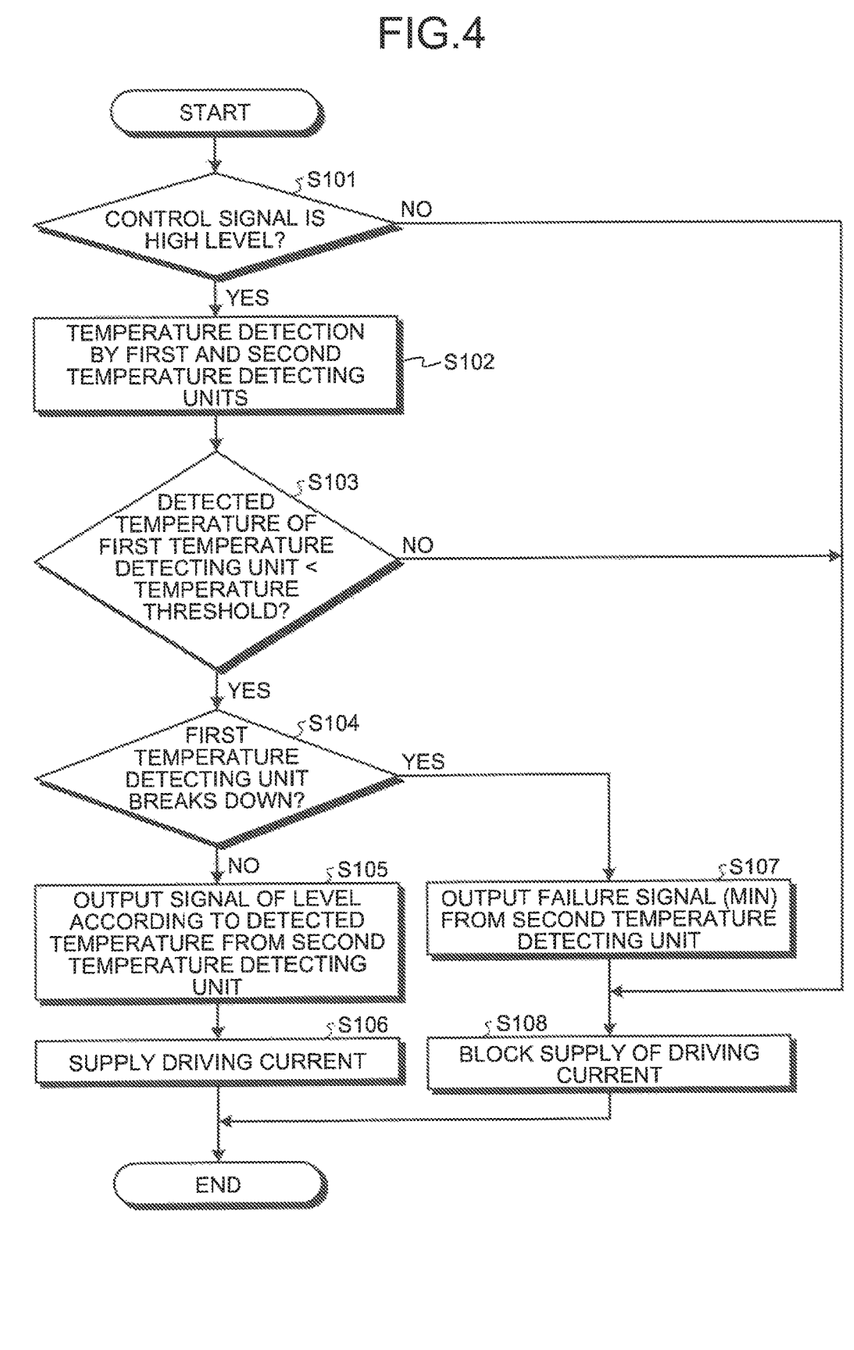
FIG. 4 is a flowchart illustrating a process that is executed by a driving circuit according to the embodiment.

Next, a process that is executed by the driving circuit 3 will be explained with reference to FIG. 4. FIG. 4 is a flowchart illustrating a process that is executed by the driving circuit 3 according to the embodiment. The driving circuit 3 repeatedly performs the process illustrated in FIG. 4 while a power source is supplied to the control device 1.

Specifically, as illustrated in FIG. 4, the driving circuit 3 determines whether a control signal input from the controller 2 is a Hi level (Step S101). Then, when it is determined that the control signal is not a Hi level (Step S101: No), the driving circuit 3 blocks the supply of a driving current to the load L (Step S108) and terminates the process.

On the other hand, when it is determined that the control signal is a Hi level (Step S101: Yes), the driving circuit 3 performs temperature detection by the first temperature detecting unit 5 and the second temperature detecting unit 8 (Step S102). Next, the driving circuit 3 performs determination of whether a detected temperature of the first temperature detecting unit 5 is less than a temperature threshold (Step S103).

Then, when it is determined that the detected temperature of the first temperature detecting unit 5 is not less than the temperature threshold (Step S103: No), the driving circuit 3 blocks the supply of a driving current to the load L (Step S108) and terminates the process.

On the other hand, when it is determined that the detected temperature of the first temperature detecting unit 5 is less than the temperature threshold (Step S103: Yes), the driving circuit 3 determines whether the first temperature detecting unit 5 breaks down (Step S104).

Then, when it is determined that the first temperature detecting unit 5 does not break down (Step S104: No), the driving circuit 3 causes the second temperature detecting unit 8 to output a signal of a level according to the detected temperature to the controller 2 (Step S105). Furthermore, the driving circuit 3 performs the supply of a driving current to the load L (Step S106) and terminates the process.

On the other hand, when it is determined that the first temperature detecting unit 5 breaks down (Step S104: Yes), the driving circuit 3 causes the second temperature detecting unit 8 to output a signal of the minimum (MIN) level to be able to be output to the controller 2 as a failure signal (Step S107). Furthermore, the driving circuit 3 blocks the supply of a driving current to the load L (Step S108) and terminates the process.

Figure 5:
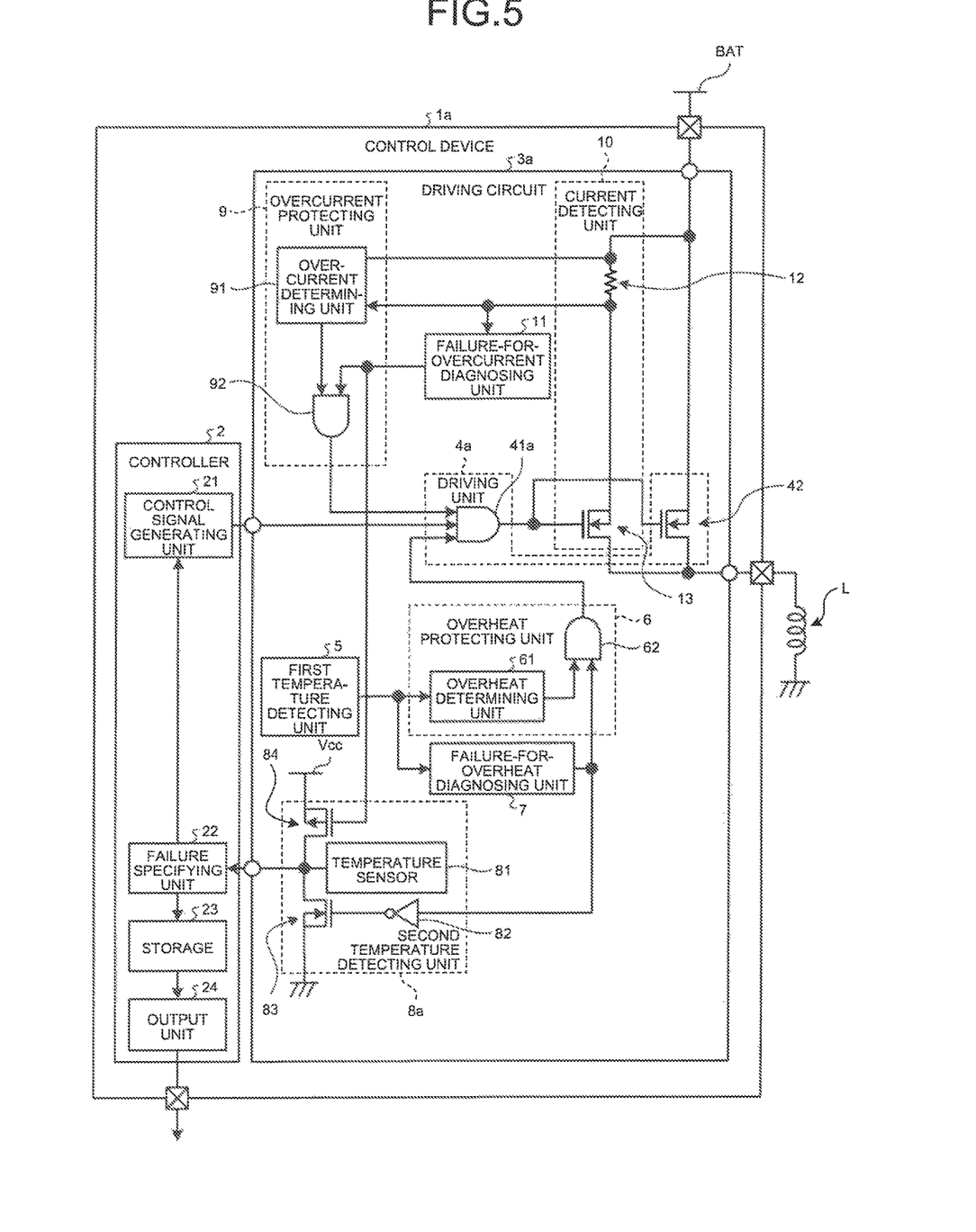
FIG. 5 is a diagram explaining the configuration of a control device according to an alternative example of the embodiment.

Next, a control device 1a according to an alternative example of the embodiment will be explained with reference to FIG. 5. FIG. 5 is a diagram explaining the configuration of the control device 1a according to an alternative example of the embodiment. The control device 1a includes a third fail-safe system in addition to the first fail-safe system and the second fail-safe system as described above.

The third fail-safe system is a system that determines an overcurrent state of a driving circuit 3a of the control device 1a to block the supply of a driving current to the load L from the power source line BAT. The driving circuit 3a of the control device 1a is different from the driving circuit 3 included in the control device 1 illustrated in FIG. 1 in that a configuration for performing a protection on an abnormal large current flowing into the driving circuit 3a is further employed.

The configuration for performing overheat protection included in the driving circuit 3a illustrated in FIG. 5 is the same configuration as the configuration for performing overheat protection included in the driving circuit 3 illustrated in FIG. 1. For this reason, the same reference numbers as those illustrated in FIG. 1 are assigned to components related to overheat protection, and their descriptions are omitted.

As illustrated in FIG. 5, the control device 1a further includes a current detecting unit 10, a failure-for-overcurrent diagnosing unit 11, and an overcurrent protecting unit 9 in addition to the configuration included in the control device 1 illustrated in FIG. 1. Moreover, an AND circuit 41a included in a driving unit 4a of the driving circuit 3a receives signals from the overcurrent protecting unit 9 as well as the control signal generating unit 21 and the overheat protecting unit 6.

Only when all the levels of three signals to be input are Hi, the AND circuit 41a outputs a Hi-level signal to the nMOS 42 of the driving unit 4a. On the other hand, even when one of the three signals to be input is Lo, the AND circuit 41a outputs a Lo-level signal to the nMOS 42 of the driving unit 4a. Herein, it is assumed that Hi-level signals are input into the AND circuit 41a from the control signal generating unit 21 and the overheat protecting unit 6.

A second temperature detecting unit 8a included in the driving circuit 3a further includes a pMOS 84 in addition to the configuration of the second temperature detecting unit 8 illustrated in FIG. 1. The source of the pMOS 84 is connected to the reference voltage line Vcc, its drain is connected to the output of the temperature sensor 81, and its gate is connected to the output of the failure-for-overcurrent diagnosing unit 11. Moreover, the level of the reference voltage line Vcc is a level higher than a level corresponding to the upper limit of the temperature range detectable by the temperature sensor 81.

The current detecting unit 10 includes a detection resistor 12 and a current-detection nMOS 13. The current-detection nMOS 13 has, for example, a gate area corresponding to around 1/1000 of the gate area of the nMOS 42 of the driving unit 4a, and lets a current flow, whose size is around 1/1000 of a driving current that the driving circuit 3a supplies to the load L, when being turned ON.

One end of the detection resistor 12 is connected to the power source line BAT and the overcurrent protecting unit 9, and the other end is connected to the drain of the current-detection nMOS 13, the failure-for-overcurrent diagnosing unit 11, and the overcurrent protecting unit 9. The source of the current-detection nMOS 13 is connected to the source of the nMOS 42 of the driving unit 4a, and its gate is connected to the output of the AND circuit 41a of the driving unit 4a.

The current detecting unit 10 generates a current of about 1/1000 of the driving current that the driving circuit 3a supplies to the load L, generates a signal of a level according to the detected current by the detection resistor 12 from the generated current, and outputs the signal to the failure-for-overcurrent diagnosing unit 11 and the overcurrent protecting unit 9.

The current detecting unit 10 has a detectable current range. The current detecting unit 10 outputs a signal having a level of 2V, for example, when detecting a current of the lower limit of the detectable current range, and outputs a signal having a level of 4V, for example, when detecting a current of the upper limit of the detectable current range.

In other words, the current detecting unit 10 outputs, in a state where any does not break down, a signal of a level according to a detected current between levels of 2V to 4V to an overcurrent determining unit 91 and the failure-for-overcurrent diagnosing unit 11. Moreover, when the detection resistor 12 has a short-circuit failure, for example, the current detecting unit 10 outputs a signal of a level (0V) lower than a level corresponding to the lower limit of the detectable current to the overcurrent determining unit 91 and the failure-for-overcurrent diagnosing unit 11.

When the level of the signal output from the current detecting unit 10 becomes not less than a current threshold, the overcurrent protecting unit 9 determines that the driving circuit 3a is in an overcurrent state and causes the driving unit 4a to block the supply of the driving current to the load L. The overcurrent protecting unit 9 includes the overcurrent determining unit 91 and an AND circuit 92.

When the level of the signal input from the current detecting unit 10 is less than the current threshold, the overcurrent determining unit 91 determines that the driving circuit 3a is not in an overcurrent state but has a normal current, and outputs a Hi-level signal to the AND circuit 92. On the other hand, when the level of the signal input from the current detecting unit 10 is not less than the current threshold, the overcurrent determining unit 91 determines that the driving circuit 3a is in an overcurrent state and outputs a Lo-level signal to the AND circuit 92.

When the levels of the signal input from the overcurrent determining unit 91 and the signal input from the failure-for-overcurrent diagnosing unit 11 are a Hi level together, the AND circuit 92 of the overcurrent protecting unit 9 outputs a Hi-level signal to the AND circuit 41a of the driving unit 4a.

When both or one of the level of the signal input from the overcurrent determining unit 91 and the level of the signal input from the failure-for-overcurrent diagnosing unit 11 are/is the Lo level, the AND circuit 92 of the overcurrent protecting unit 9 outputs the Lo-level signal to the AND circuit 41a of the driving unit 4a.

When the signal of the level corresponding to the current within the current range detectable by the current detecting unit 10 is output from the current detecting unit 10, the failure-for-overcurrent diagnosing unit 11 determines that the current detecting unit 10 does not break down. Moreover, when a signal of a level lower than a level corresponding to a lower limit of a current detectable by the current detecting unit 10 is output from the current detecting unit 10, the failure-for-overcurrent diagnosing unit 11 determines that the current detecting unit 10 breaks down.

Then, when it is determined that the current detecting unit 10 breaks down, the failure-for-overcurrent diagnosing unit 11 causes the driving unit 4a to block the supply of the driving current to the load L, and causes the second temperature detecting unit 8a to output a signal of a level corresponding to a temperature out of the temperature range detectable by the second temperature detecting unit 8a to the controller 2.

When it is determined that the current detecting unit 10 does not break down, the failure-for-overcurrent diagnosing unit 11 outputs the Hi-level signal to the AND circuit 92 of the overcurrent protecting unit 9 and the pMOS 84 of the second temperature detecting unit 8a.

On the other hand, when it is determined that the current detecting unit 10 breaks down, the failure-for-overcurrent diagnosing unit 11 outputs the Lo-level signal to the AND circuit 92 of the overcurrent protecting unit 9 and the pMOS 84 of the second temperature detecting unit 8a. The failure-for-overcurrent diagnosing unit 11 can be constituted by the same circuit and comparator as those of the failure-for-overheat diagnosing unit 7 illustrated in FIG. 2, for example.

When the Hi-level signal is input from the failure-for-overcurrent diagnosing unit 11, namely the current detecting unit 10 does not break down, the second temperature detecting unit 8a turns OFF the pMOS 84. As a result, the second temperature detecting unit 8a outputs a signal of a level according to the temperature detected by the temperature sensor 81 to the failure specifying unit 22 of the controller 2.

When the signal of the level corresponding to the temperature within the temperature range detectable by the temperature sensor 81 is input from the second temperature detecting unit 8a, the failure specifying unit 22 can monitor a temperature condition of the driving circuit 3a on the basis of the input signal.

Then, when the driving circuit 3a becomes an overheated state, the failure specifying unit 22 can output a signal indicating that effect to the control signal generating unit 21 to block the supply of the driving current to the load L. Therefore, the control device 1a can prevent the burnout destruction caused by the overheated state of the driving circuit 3a.

When the Lo-level signal is input from the failure-for-overcurrent diagnosing unit 11, namely the current detecting unit 10 breaks down, the second temperature detecting unit 8a turns ON the pMOS 84. As a result, because the output of the temperature sensor 81 is connected to the reference voltage line Vcc, the second temperature detecting unit 8a outputs a signal of a level higher than a level corresponding to the upper limit of the temperature range detectable by the temperature sensor 81 to the failure specifying unit 22 of the controller 2.

When the signal of the level higher than the level corresponding to the upper limit of the temperature range detectable by the temperature sensor 81 is input from the second temperature detecting unit 8a, the failure specifying unit 22 can specify that the failure of the driving circuit 3a is the failure of the current detecting unit 10.

Then, when it is specified that the current detecting unit 10 breaks down, the failure specifying unit 22 can output a signal indicating that effect to the control signal generating unit 21 to block the supply of the driving current to the load L. Therefore, the control device 1a can prevent the burnout destruction caused by the overcurrent state of the driving circuit 3a.

As described above, when the current detecting unit 10 breaks down, the driving circuit 3a included in the control device 1a outputs a signal of a high level that does not exist in a normal term (term in which the current detecting unit 10 does not break down) to the controller 2 as diagnosis output. As a result, the driving circuit 3a can inform the controller 2 that the current detecting unit 10 breaks down.

Therefore, even if the third fail-safe system for performing overcurrent protection is in a state where the system does not function, the control device 1a can specify the generation of the state by the controller 2, immediately block the provision of a driving current to the load L, and thus prevent the burnout destruction of the driving circuit 3a.

The driving circuit 3a shares an output terminals, which outputs the detection result of a temperature performed by the temperature sensor 81, as an output terminals of diagnosis output indicating that the current detecting unit 10 breaks down. As a result, the control device 1a can suppress the increase of the number of output terminals of the driving circuit 3a and the number of input terminals of the controller 2.

According to the present embodiment, the driving circuit 3a can inform the controller 2 that the current detecting unit 10 breaks down, and the controller 2 can specify that the current detecting unit 10 breaks down, without largely changing a design of software and hardware.

Next, an operation in each state of the control device 1a will be explained with reference to FIG. 5 and FIG. 6. Because operating states related to overheat protection performed by the control device 1a are the same as the operating states illustrated in FIG. 3, operating states related to overcurrent protection are explained herein, and explanations of operating states related to overheat protection are omitted. Herein, a case where the driving circuit 3a is not in an overheated state and the first temperature detecting unit 5 does not break down will be explained.

Figure 6:
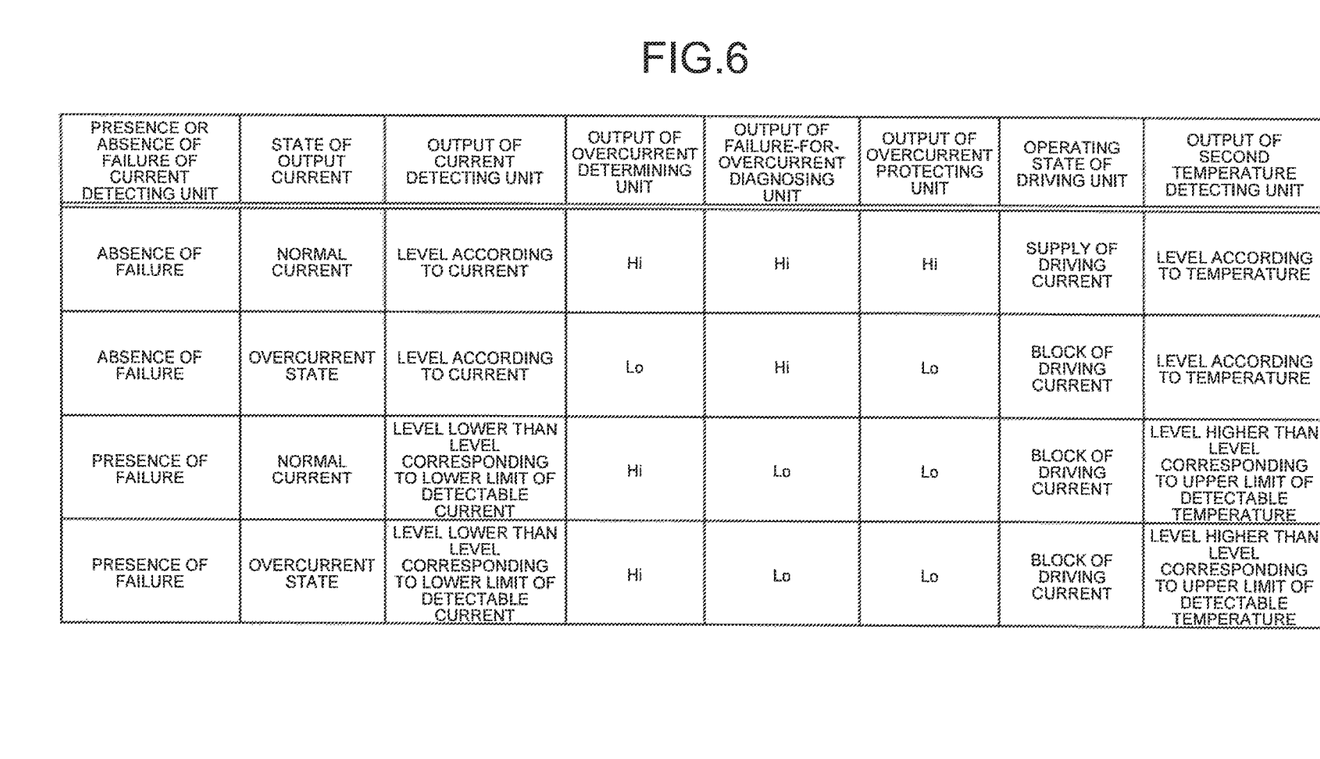
FIG. 6 is a diagram explaining an operating state in each state of the control device according to the alternative example of the embodiment.

FIG. 6 is a diagram explaining an operating state in each state of the control device 1a according to an alternative example of the embodiment. As illustrated in FIG. 6, when the current detecting unit 10 does not have a failure and the driving circuit 3a is not in an overcurrent state and has a normal current, the level of the output of the current detecting unit 10 becomes a level according to a detected current.

In this case, because the level of the output of the overcurrent determining unit 91 becomes Hi and the level of the output of the failure-for-overcurrent diagnosing unit 11 becomes Hi, the level of the output of the overcurrent protecting unit 9 becomes Hi. As a result, the driving unit 4a can continue to supply the driving current to the load L.

At this time, the level of the output of the second temperature detecting unit 8a becomes a level according to a detected temperature. As a result, the controller 2 can monitor a temperature condition of the driving circuit 3a on the basis of the level of the output of the second temperature detecting unit 8a.

When the current detecting unit 10 does not have a failure and the driving circuit 3a is in an overcurrent state, the level of the output of the current detecting unit 10 becomes a level according to a detected current. In this case, because the level of the output of the overcurrent determining unit 91 becomes Lo and the level of the output of the failure-for-overcurrent diagnosing unit 11 becomes Hi, the level of the output of the overcurrent protecting unit 9 becomes Lo. As a result, the driving unit 4a can block the supply of the driving current to the load L.

At this time, the level of the output of the second temperature detecting unit 8a becomes a level according to a detected temperature. As a result, the controller 2 can monitor a temperature condition of the driving circuit 3a on the basis of the level of the output of the second temperature detecting unit 8a.

When the current detecting unit 10 has a failure and the driving circuit 3a has a normal current, the level of the output of the current detecting unit 10 becomes a level corresponding to a current lower than the lower limit of the detectable current. In this case, because the level of the output of the overcurrent determining unit 91 becomes Hi and the level of the output of the failure-for-overcurrent diagnosing unit 11 becomes Lo, the level of the output of the overcurrent protecting unit 9 becomes Lo. As a result, the driving unit 4a can block the supply of the driving current to the load L.

At this time, the level of the output of the second temperature detecting unit 8a becomes a level corresponding to a temperature higher than the upper limit of the detectable temperature. As a result, the driving circuit 3a can inform the controller 2 that the current detecting unit 10 breaks down.

When the current detecting unit 10 has a failure and the driving circuit 3a is in an overcurrent state, the level of the output of the current detecting unit 10 becomes a level corresponding to a current lower than the lower limit of the detectable current. In this case, because the level of the output of the overcurrent determining unit 91 becomes Hi and the level of the output of the failure-for-overcurrent diagnosing unit 11 becomes Lo, the level of the output of the overcurrent protecting unit 9 becomes Lo. As a result, the driving unit 4a can block the supply of the driving current to the load L.

At this time, the level of the output of the second temperature detecting unit 8a becomes a level corresponding to a temperature higher than the lower limit of the detectable temperature. As a result, the driving circuit 3a can inform the controller 2 that the current detecting unit 10 breaks down.

Next, a process that is executed by the driving circuit 3a will be explained with reference to FIG. 7. Herein, a process that is performed when the driving circuit 3a performs overheat protection is similar to the process that is performed when the driving circuit 3 illustrated in FIG. 1 performs overheat protection. For this reason, a process that is performed when the driving circuit 3a performs overcurrent protection will be explained, and explanations for the process that is performed when the driving circuit 3a performs overheat protection are omitted.

Figure 7:
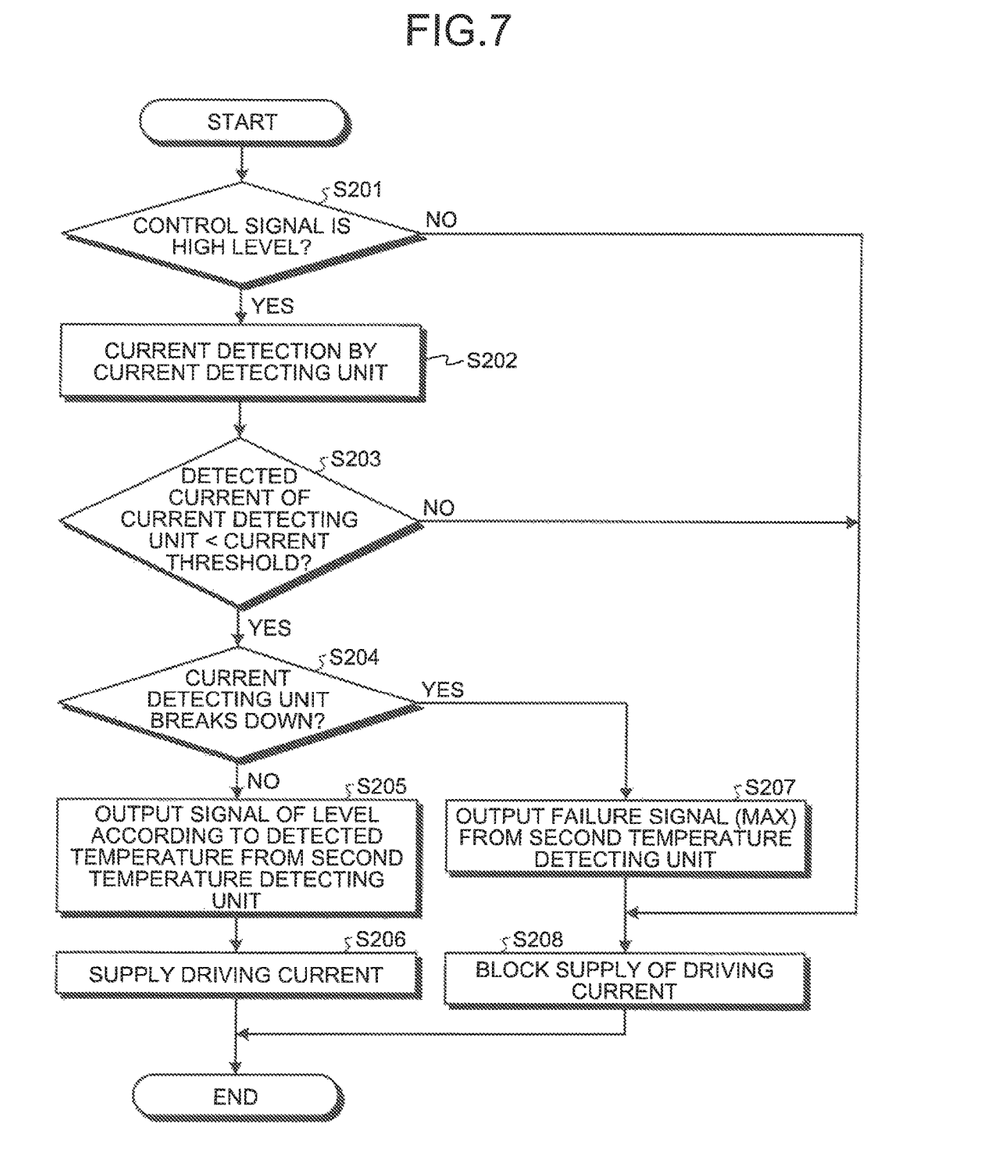
FIG. 7 is a flowchart illustrating a process that is executed by a driving circuit according to the alternative example of the embodiment.

FIG. 7 is a flowchart illustrating a process that is executed by the driving circuit 3a according to the alternative example of the embodiment. The driving circuit 3a repeatedly performs the process illustrated in FIG. 7 while a power source is supplied to the control device 1a.

Specifically, as illustrated in FIG. 7, the driving circuit 3a determines whether a control signal input from the controller 2 is a Hi level (Step S201). Then, when it is determined that the control signal is not a Hi level (Step S201: No), the driving circuit 3a blocks the supply of a driving current to the load L (Step S208), and terminates the process.

When it is determined that the control signal is a Hi level (Step S201: Yes), the driving circuit 3a performs a current detection by the current detecting unit 10 (Step S202). Next, the driving circuit 3a determines which the detected current of the current detecting unit 10 is smaller than a current threshold (Step S203).

Then, when it is determined that the detected current of the current detecting unit 10 is not less than the current threshold (Step S203: No), the driving circuit 3a blocks the supply of a driving current to the load L (Step S208), and terminates the process. On the other hand, when it is determined that the detected current of the current detecting unit 10 is smaller than the current threshold (Step S203: Yes), the driving circuit 3a determines whether the current detecting unit 10 breaks down (Step S204).

Then, when it is determined that the current detecting unit 10 does not break down (Step S204: No), the driving circuit 3a outputs a signal of a level according to the detected temperature to the controller 2 from the second temperature detecting unit 8a (Step S205). Furthermore, the driving circuit 3a performs the supply of a driving current to the load L (Step S206), and terminates the process.

On the other hand, when it is determined that the current detecting unit 10 breaks down (Step S204: Yes), the driving circuit 3a outputs a signal of the maximum (MAX) level as a failure signal to the controller 2 from the second temperature detecting unit 8a (Step S207). Furthermore, the driving circuit 3a blocks the supply of a driving current to the load L (Step S208), and terminates the process.

As described above, the control device according to the embodiment includes a driving circuit. The driving circuit includes a driving unit, a first temperature detecting unit, an overheat protecting unit, a second temperature detecting unit, and a failure-for-overheat diagnosing unit. The driving unit supplies a driving current from a power source to a load to drive the load on the basis of a control signal input from a controller.

The first temperature detecting unit detects a temperature, and outputs a signal of a level according to the detected temperature. When the level of the signal output from the first temperature detecting unit is not less than a temperature threshold, the overheat protecting unit causes the driving unit to block the supply of the driving current to the load.

The second temperature detecting unit detects a temperature, and outputs a signal of a level according to the detected temperature to the controller.

The failure-for-overheat diagnosing unit performs a failure diagnosis of the first temperature detecting unit. When it is determined that the first temperature detecting unit breaks down, the failure-for-overheat diagnosing unit causes the driving unit to block the supply of the driving current to the load and causes the second temperature detecting unit to output a signal of a level corresponding to a temperature out of a temperature range detectable by the second temperature detecting unit to the controller. As a result, the driving circuit can inform the controller of the presence or absence of a failure of the temperature detecting unit in the driving circuit.

When a signal of a level lower than a level corresponding to the lower limit of the temperature detectable by the first temperature detecting unit is output from the first temperature detecting unit, the failure-for-overheat diagnosing unit determines that the first temperature detecting unit breaks down. As a result, the driving circuit can detect a failure that the output of the first temperature detecting unit is fixed at an overheated state non-detection side.

When it is determined that the first temperature detecting unit breaks down, the failure-for-overheat diagnosing unit causes the second temperature detecting unit to output a signal of a level lower than a level corresponding to the lower limit of the temperature detectable by the second temperature detecting unit to the controller. As a result, the driving circuit can inform the controller of the generation of the failure that the output of the first temperature detecting unit is fixed at the overheated state non-detection side.

The driving circuit includes a current detecting unit, an overcurrent protecting unit, and a failure-for-overcurrent diagnosing unit. The current detecting unit detects a driving current to be supplied to the load from the driving unit, and outputs a signal of a level according to the detected current. When the level of the signal output from the current detecting unit is not more than the current threshold, the overcurrent protecting unit causes the driving unit to block the supply of the driving current to the load.

The failure-for-overcurrent diagnosing unit performs a failure diagnosis of the current detecting unit. When it is determined that the current detecting unit has a failure, the failure-for-overcurrent diagnosing unit causes the driving unit to block the supply of the driving current to the load, and causes the second temperature detecting unit to output a signal of a level corresponding to a temperature out of the temperature range detectable by the second temperature detecting unit to the controller. As a result, the driving circuit can inform the controller of the presence or absence of a failure of the current detecting unit in the driving circuit.

When a signal of a level lower than a level corresponding to the lower limit of the current detectable by the current detecting unit is output from the current detecting unit, the failure-for-overcurrent diagnosing unit determines that the current detecting unit has a failure. As a result, the driving circuit can detect a failure that the output of the current detecting unit is fixed at an overcurrent state non-detection side.

When it is determined that the current detecting unit has a failure, the failure-for-overcurrent diagnosing unit causes the second temperature detecting unit to output a signal of a level higher than a level corresponding to the upper limit of the temperature detectable by the second temperature detecting unit to the controller. As a result, the driving circuit can inform the controller of the generation of the failure that the output of the current detecting unit is fixed at the overcurrent state non-detection side, and can further cause the controller to distinguish between an overcurrent state and an overheated state.

The controller includes a failure specifying unit that specifies that the failure of the driving circuit is the failure of the first temperature detecting unit on the basis of the signal input from the second temperature detecting unit. As a result, because the driving circuit can use an output terminal of a signal indicating a temperature detected by the second temperature detecting unit as an output terminal of a signal indicating the failure of the first temperature detecting unit, it is possible to suppress the increase of the number of output terminals of the driving circuit and the number of input terminals of the controller.

The controller includes a storage that stores therein a specified result of a failure performed by the failure-for-overheat specifying unit. As a result, the control device can use the specified result of the failure stored in the storage for the check and checkback of the driving circuit.

The controller includes an output unit that outputs the specified result performed by the failure specifying unit. As a result, the control device can inform a user of the failure of the driving circuit.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A driving circuit comprising:
   a driving unit that supplies a driving current from a power source to a load to drive the load based on a control signal input from a controller;
   a first temperature detecting unit that detects a temperature and outputs a signal of a level according to the detected temperature;
   an overheat protecting unit that causes the driving unit to block supply of the driving current to the load when the level of the signal output from the first temperature detecting unit is not less than a temperature threshold;
   a second temperature detecting unit that detects a temperature and outputs a signal of a level according to the detected temperature to the controller; and
   a failure-for-overheat diagnosing unit that performs a failure diagnosis on the first temperature detecting unit, and when it is determined that the first temperature detecting unit breaks down, causes the driving unit to block supply of the driving current to the load and causes the second temperature detecting unit to output a signal of a level corresponding to a temperature out of a temperature range detectable by the second temperature detecting unit to the controller.

2. The driving circuit according to claim 1, wherein the failure-for-overheat diagnosing unit determines that the first temperature detecting unit breaks down when a signal of a level lower than a level corresponding to a lower limit of a temperature detectable by the first temperature detecting unit is output from the first temperature detecting unit.

3. The driving circuit according to claim 1, wherein the failure-for-overheat diagnosing unit causes the second temperature detecting unit to output a signal of a level lower than a level corresponding to a lower limit of a temperature detectable by the second temperature detecting unit to the controller when it is determined that the first temperature detecting unit breaks down.

4. The driving circuit according to claim 1, further comprising:
   a current detecting unit that detects a driving current supplied from the driving unit to the load and outputs a signal of a level according to the detected current;
   an overcurrent protecting unit that causes the driving unit to block supply of the driving current to the load when the level of the signal output from the current detecting unit is not less than a current threshold; and
   a failure-for-overcurrent diagnosing unit that performs a failure diagnosis on the current detecting unit, and when it is determined that the current detecting unit breaks down, causes the driving unit to block supply of the driving current to the load and causes the second temperature detecting unit to output a signal of a level corresponding to a temperature out of the temperature range detectable by the second temperature detecting unit to the controller.

5. The driving circuit according to claim 4, wherein the failure-for-overcurrent diagnosing unit determines that the current detecting unit breaks down when a signal of a level lower than a level corresponding to a lower limit of a current detectable by the current detecting unit is output from the current detecting unit.

6. The driving circuit according to claim 4, wherein the failure-for-overcurrent diagnosing unit causes the second temperature detecting unit to output a signal of a level higher than a level corresponding to an upper limit of a temperature detectable by the second temperature detecting unit to the controller when it is determined that the current detecting unit breaks down.

7. A control device comprising:
   a driving circuit including:
      a driving unit that supplies a driving current from a power source to a load to drive the load based on a control signal input from a controller;
      a first temperature detecting unit that detects a temperature and outputs a signal of a level according to the detected temperature;
      an overheat protecting unit that causes the driving unit to block supply of the driving current to the load when the level of the signal output from the first temperature detecting unit exceeds a temperature threshold;
      a second temperature detecting unit that detects a temperature and outputs a signal of a level according to the detected temperature to the controller; and
      a failure-for-overheat diagnosing unit that performs a failure diagnosis on the first temperature detecting unit, and when it is determined that the first temperature detecting unit breaks down, causes the driving unit to block supply of the driving current to the load and causes the second temperature detecting unit to output a signal of a level corresponding to a temperature out of a temperature range detectable by the second temperature detecting unit to the controller; and
   a failure specifying unit that is provided in the controller and specifies that a failure of the driving circuit is a failure of the first temperature detecting unit based on the signal input from the second temperature detecting unit.

8. The control device according to claim 7, wherein the controller includes a storage that stores therein a specified result of a failure performed by the failure-for-overheat diagnosing unit.

9. The control device according to claim 7, wherein the controller includes an output unit that outputs a specified result performed by the failure specifying unit.

10. A protection method for a driving circuit that is executed by a computer, the protection method comprising:
- detecting, by a first temperature detecting unit, a temperature of a driving circuit that includes a driving unit that supplies a driving current from a power source to a load to drive the load based on a control signal input from a controller, and outputting a signal of a level according to the detected temperature from the first temperature detecting unit;
- causing, by an overheat protecting unit, the driving unit to block supply of the driving current to the load when the level of the signal output from the first temperature detecting unit exceeds a temperature threshold;
- detecting, by a second temperature detecting unit, a temperature and outputting a signal of a level according to the detected temperature to the controller; and
- when a failure-for-overheat diagnosing unit performs a failure diagnosis on the first temperature detecting unit and determines that the first temperature detecting unit has a failure, causing the driving unit to block supply of the driving current to the load and causing the second temperature detecting unit to output a signal of a level corresponding to a temperature out of a temperature range detectable by the second temperature detecting unit to the controller.

* * * * *